(12) United States Patent
Watanabe

(10) Patent No.: US 6,926,944 B2
(45) Date of Patent: Aug. 9, 2005

(54) DOOR OPENING TRIM WEATHER STRIP FOR MOTOR VEHICLE

(75) Inventor: Hiroya Watanabe, Novi, MI (US)

(73) Assignee: Toyoda Gosei Co., Ltd., Aichi-ken (JP)

( * ) Notice: Subject to any disclaimer, the term of this patent is extended or adjusted under 35 U.S.C. 154(b) by 78 days.

(21) Appl. No.: 10/721,755

(22) Filed: Nov. 26, 2003

(65) Prior Publication Data

US 2004/0137197 A1 Jul. 15, 2004

(30) Foreign Application Priority Data

Nov. 27, 2002 (JP) ........................................ 2002-343291

(51) Int. Cl.[7] ................................................. B32B 3/26
(52) U.S. Cl. ..................................... 428/122; 49/490.1
(58) Field of Search .............................. 428/122, 36.9; 49/490.1, 498.1

(56) References Cited

U.S. PATENT DOCUMENTS 4,745,016 A    5/1988   Hashimoto et al.
4,787,668 A   11/1988   Kawase et al.

FOREIGN PATENT DOCUMENTS

| JP | A-2000-25535 | 1/2000 |
|---|---|---|
| JP | A-2000-142266 | 5/2000 |

*Primary Examiner*—Alexander S. Thomas
(74) *Attorney, Agent, or Firm*—Posz Law Group, PLC

(57) ABSTRACT

A door opening trim weather strip for a motor vehicle, which can be readily attached to a flange provided in a door opening portion of a vehicle body and is difficult to be pulled thereoff. The door opening trim weather strip includes a trim portion in which the flange is adapted to be inserted, and a seal portion for sealing between the door opening portion and a vehicle door. The trim portion includes a plurality of outer flange holding lips which respectively extend from an outer side wall of the trim portion, and two inner flange holding lips which respectively extend from an inner side wall of the trim portion. Each of the two inner flange holding lip has a connecting part which obliquely extends from the inner side wall toward an open mouth of the trim portion, and a main part which extends from an extending end of the connecting part obliquely toward the bottom wall of the trim portion, thereby defining a generally inverted v-shaped cross-section.

3 Claims, 3 Drawing Sheets

DOOR OPENING TRIM WEATHER STRIP FOR MOTOR VEHICLE

CROSS-REFERENCE TO RELATED APPLICATION

This application is related to and claims priority from Japanese patent application No. 2002-343291, incorporated herein by reference.

BACKGROUND OF THE INVENTION

1. Field of the Invention

The present invention relates to a door opening trim weather strip for providing a seal between a door opening portion and a door of a motor vehicle.

2. Description of Related Art

FIG. 1 shows a partially cut away side view of a motor vehicle. To provide a seal between a door opening portion 10 of a vehicle body and a door 12, a door opening trim weather strip (not shown) is attached to the door opening portion 10. One example of a conventional door opening trim weather strip is shown in FIG. 2.

As shown, a door opening trim weather strip 14 includes a trim portion 16 and a tubular seal portion 18. The door opening trim weather strip 14 is attached to the door opening portion 10 by inserting a flange 20 provided in the door opening portion 10 into an interior of the trim portion 16.

When the door 12 is closed, the tubular seal portion 18 of the door opening trim weather strip 14 contacts and presses a protruding part 22, for example, of the door 12 to seal between the door opening portion 10 and the door 12, as disclosed in Publication of Japanese unexamined patent application No. 2000-142266, on pages 2 to 3, and in FIG. 1, for example.

The trim portion 16 has a U-shaped cross-section, and has flange holding lips for holding the flange 20. The flange holding lips respectively project into the interior of the trim portion 16.

The flange holding lips include outer holding lips 24 extending from an outer side wall 26 of the trim portion 16 and an inner holding lip 28 extending from an inner side wall 30 of the trim portion 16. To hold the flange 20 securely irrespective of variations in the flange thickness, the outer holding lips 24 are made short, whereas the inner holding lip 28 is made long. Publication of Japanese unexamined patent application No. 2000-25535, on pages 3 to 4, and in FIG. 3, for example, discloses that three short outer holding lips and one long inner holding lip are provided for facilitating the production thereof, and ensuring a low inserting load of the flange upon mounting on the flange.

Where the door opening trim weather strip 14 having one inner holding lip 28 is attached along corners in the vehicle body, the inner flange holding lip 28 deforms to approach the inner side wall 30 due to the bending of the trim portion 16, to define a gap between the inner flange holding lip 28 and the flange 20. Consequently, the door opening trim weather strip 14 may tilt sidewardly of the flange 20.

The number of body panels which are joined to form flanges varies according to the portions of the vehicle body. For example, in some portions, one or two body panels form the flange, and in other portions, five body panels form the flange. Consequently, the flange thickness greatly varies in the vehicle body.

To mount the door opening trim weather strip on the flanges having various thickness, as described above, it is necessary to enlarge the width of the interior of the trim portion having a generally U-shaped cross-section, that is the distance between facing side walls of the trim portion, and increase the length of the inner flange holding lip 28.

Upon mounting the door opening trim weather strip on the flanges having various thickness, there has been used a roll forming method of first spreading the side walls of the trim portion 16 to enlarge the width of an open mouth thereof, and clamping the spread side walls to narrow the width of the open mouth thereof after setting the flange 20 into the interior of the trim portion 16.

In the roll forming method, the door opening trim weather strip 14 must be provisionally set on the flange 20 for positioning prior to the clamping of the side walls. To this end, conventionally, two inner flange holding lips are provided. The flange 20 is first held by a bottom-side inner flange holding lip and the outer flange holding lip 24 for positioning on and provisionally setting on the flange 20. Then the side walls of the trim portion 16 are clamped by means of a pair of clamping rollers.

Where the open mouth of the trim portion 16 is enlarged in the roll forming method; it is necessary to make the inner flange holding lip 28 close to the open mouth of the trim portion 16 long. On the other hand, where, as shown in FIG. 3, two long inner flange holding lips 28 and 32 are provided, and, as shown in FIG. 4, the flange 20 is formed by welding a plurality of body panels to each other, the two inner holding lips 28 and 32 bend toward the inner side wall 30 upon inserting the flange 20 into the interior of the trim portion 16. Consequently, the inner flange holding lip 28 close to the open mouth of the trim portion 16 contacts and pushes the inner flange holding lip 32 provided near the bottom of the trim portion 16 so as not to bend sufficiently, thereby increasing friction between the flange 20 and the inner flange holding lip 28 so as to undesirably increase an inserting load of the flange 20.

To prevent the contacting of the inner flange holding lips 28 and 32, conventionally, the inner side wall 30 is made high to enlarge the distance between the inner flange holding lips 28 and 32.

Where the inner side wall 30 is made high, however, a core member 34 such as a sheet metal, etc. which is embedded inside the trim portion must be made high, too. Consequently, the weight of a polymer material such as rubber, synthetic resin, etc. for composing the trim portion 16, and the weight of the core member 34 both increase, and the producing costs of the trim portion also increase.

As described above, in the roll forming method, the inner side wall 30 must have the inner flange holding lip 32 near the bottom thereof for positioning and provisionally setting the door opening trim weather strip 14 on the flange 20. In the roll forming method, it is unnecessary to consider an inserting load of the flange 20 into the trim portion 16, but it is necessary to increase a pulling load of the trim portion 16 off the flange 20 irrespective of variations in the thickness of the flange 20 so that the trim portion 16 is difficult to be pulled off the flange 20.

SUMMARY OF THE INVENTION

Accordingly, it is an object of the present invention to provide a door opening trim weather strip which can be readily attached to a flange in a door opening portion of a vehicle body, and cannot be readily pulled off the flange without increasing the weight thereof.

In accordance with the present invention, a door opening trim weather strip for providing a seal between a door opening portion of a body of a motor vehicle, and a door thereof, has a trim portion in which a flange provided in the door opening portion is adapted to be inserted, and a seal portion for sealing between the door opening portion and the door. The trim portion has a generally U-shaped cross-section, and includes an outer side wall, a bottom wall and an inner side wall. The trim portion further includes outer flange holding lips which extend inwardly from the outer side wall, and two inner flange holding lips which extend inwardly from the inner side wall, for holding the flange inserted in the trim portion. Each of the two inner flange holding lips has a connecting part which slightly extends from the inner side wall obliquely toward an open mouth of the trim portion, and a main part which extends from an extending end of the connecting part obliquely toward the bottom wall, thereby defining a generally inverted v-shaped cross-section.

With this arrangement, by virtue of the two inner flange holding lips, the flange can be held securely with the trim portion of the door opening trim weather strip. Accordingly, when the door opening trim weather strip is attached to corners of the vehicle body, the tilting of the trim portion relative to the flange is prevented, whereby the tubular seal portion does not deflect undesirably but contacts and presses the vehicle door with good sealing properties. Upon attaching the door opening trim weather strip by a roll forming method, the trim portion can be positioned on and provisionally set on the flange by virtue of the inner flange holding lip located near the bottom wall of the trim portion, whereby the following clamping work can be readily carried out to facilitate the attachment of the door opening trim weather strip to the vehicle body.

In addition, since the inner flange holding lips has a connecting part which slightly extends from the inner side wall obliquely toward an open mouth of the trim portion, and a main part which extends from an extending end of the connecting part obliquely toward the bottom wall, the main part of the open mouth-side inner flange holding lip bends at the joint between the connecting part and the main part when the flange is inserted into the interior of the trim portion and presses the open mouth-side inner flange holding lip toward the inner side wall. At this time, since the length of the main part can be reduced so as not to reach the bottom-side inner flange holding lip, the main part of the open mouth-side inner flange holding lip does not contact the bottom-side inner flange holding lip as well as the bottom wall. Accordingly, the conventional problem due to the contacting of the inner flange holding lips can be overcome without increasing the height of the inner side wall.

Furthermore, since each inner flange holding lip has a generally v-shaped cross-section, it readily flexes at the joint between the connecting part and the main part when the flange is inserted into the trim portion, thereby facilitating the insertion work of the flange.

Preferably, the main part of the inner flange holding lip is formed thicker than the connecting part, the inner flange holding lip further has an end part which extends from the main part toward the bottom wall into a generally L-shaped cross-section, and a recess is provided in a bottom wall-side surface of the inner flange holding lip between the main part and the end part so as to face the bottom wall.

With this arrangement, the thick main part of the inner flange holding lip is difficult to deform, and the L-shaped end part thereof has increased rigidity, and accordingly, when a pulling force is applied to the trim portion, the thick main part does not deform, thereby increasing a resistance force against the pulling force. In addition, the main part exhibits a great holding force for the flange so that the trim portion can be attached to the flange securely. And since the recess is formed between the main part and the end part, the end part can readily flex at a resultant thin joint between the main part and the end part. Accordingly, where the end part is formed thick, the end part can flex similarly at the thin joint. In this case, when a pulling force is applied to the trim portion, and a friction is generated between the inner flange holding lip and the flange, the thick end part is not deformed thereby.

Preferably, the main part of the inner flange holding lip is provided with a projection which projects from the vicinity of the joint between the connecting part and the main part toward the inner side wall so as to face the open mouth of the trim portion.

With this arrangement, since the projection is provided in the vicinity of the joint between the connecting part and the main part so as to project toward the inner side wall and face the open mouth of the trim portion, an end of the flange, which deflects during inserting in the trim portion, can be prevented from entering a space defined between the connecting part and the inner side wall.

In addition, when a pulling force is applied to the trim portion, the projection contacts and presses the inner side wall to prevent the deformation of the main part of the inner flange holding lip.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 1:
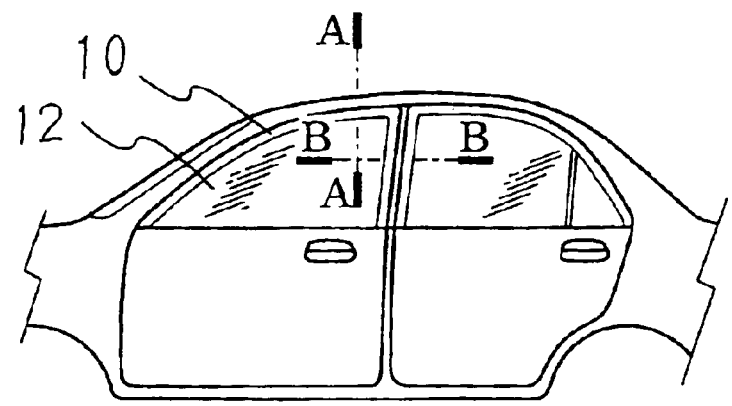
FIG. 1 is a partially cut away side view of a motor vehicle.
Figure 2:
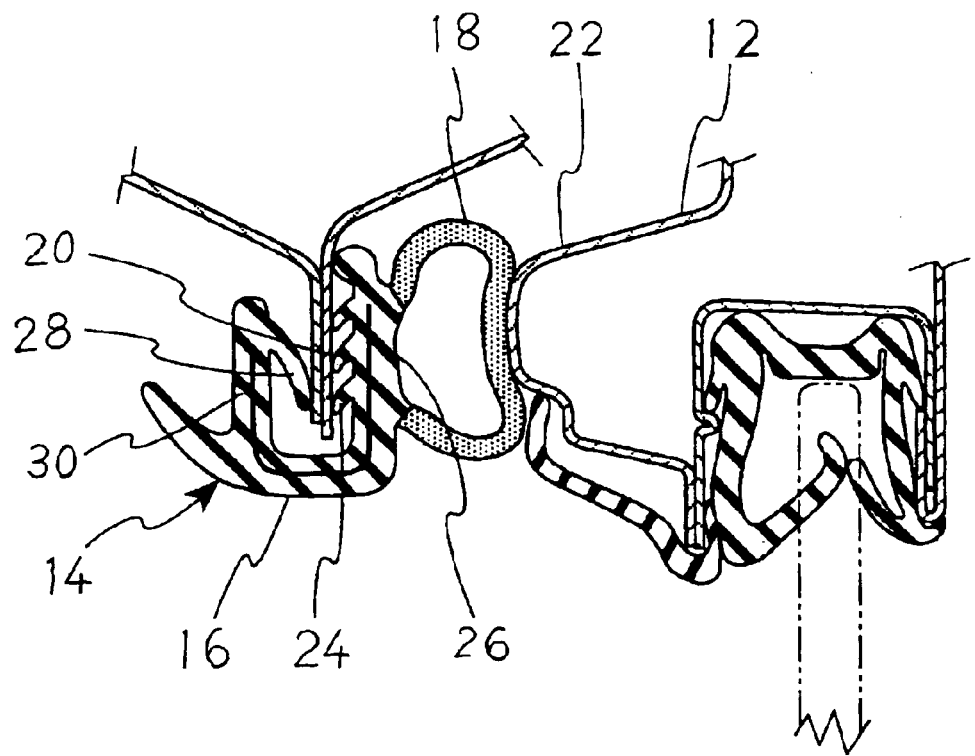
FIG. 2 is a cross-sectional view of a conventional door opening trim weather strip in an attached state to a door opening portion of a motor vehicle, which is taken along the line of A—A of FIG. 1.
Figure 3:
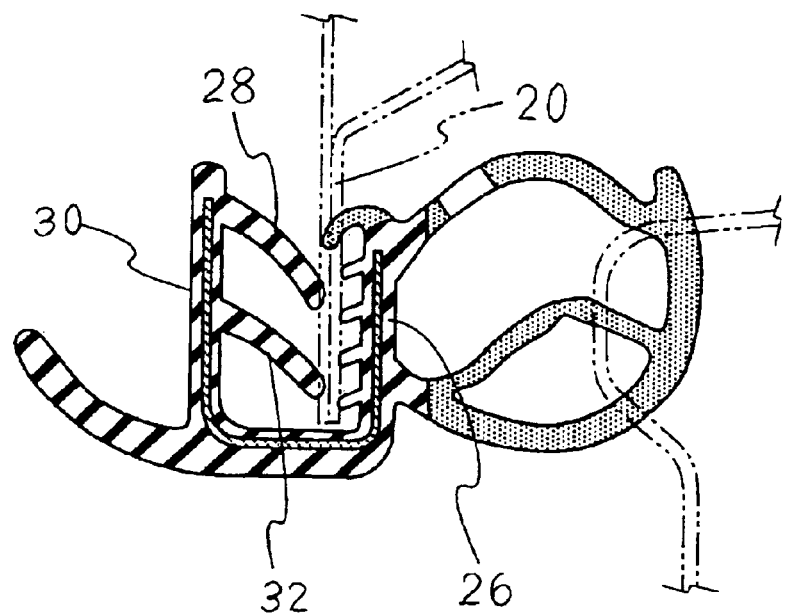
FIG. 3 is a cross-sectional view of a door opening trim weather strip in an attached state to a door opening portion of a motor vehicle, taken along the line of A—A of FIG. 1, which has been contemplated by the present inventor before completing the present invention.
Figure 4:
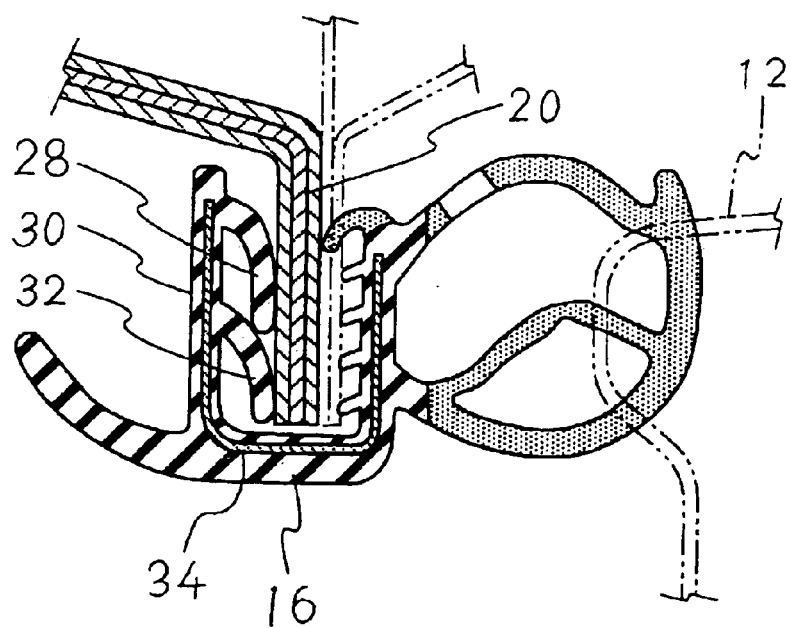
FIG. 4 is a cross-sectional view of a door opening trim weather strip in an attached state to a door opening portion of a motor vehicle, taken along the line of B—B of FIG. 1, which has been contemplated by the present inventor before completing the present invention.
Figure 5:
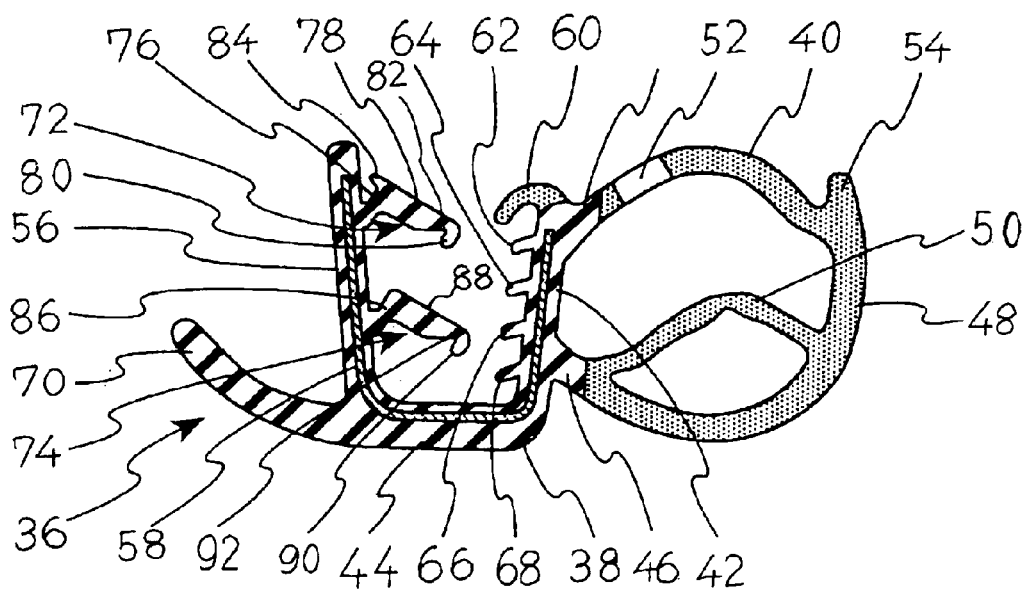
FIG. 5 is a cross-sectional view of one embodiment of a door opening trim weather strip in accordance with the present invention, which is prior to attachment to a door opening portion of a motor vehicle.
Figure 6:
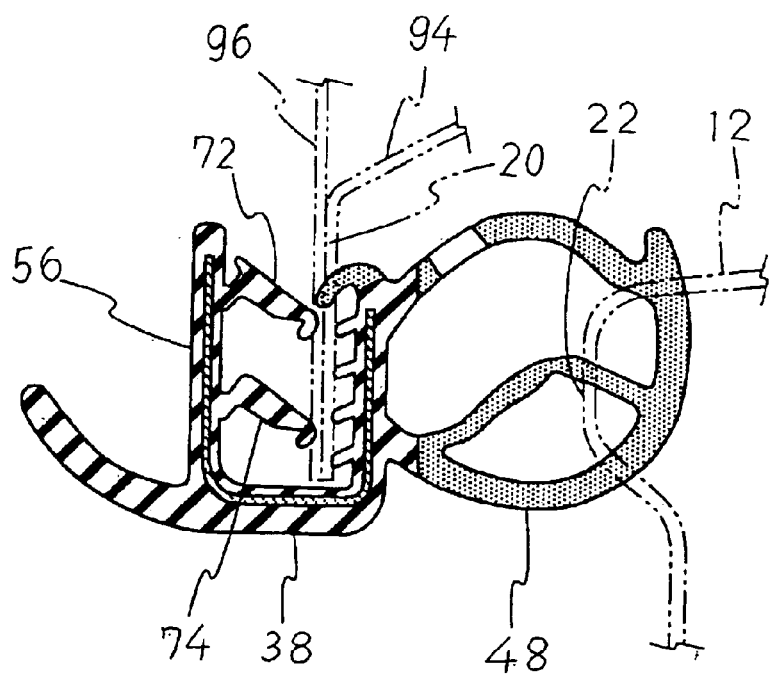
FIG. 6 is a cross-sectional view of one embodiment of a door opening trim weather strip in accordance with the present invention, which is in an attached state to a door opening portion of a motor vehicle, taken along the line of A—A of FIG. 1.

Hereinafter, one embodiment of the present invention will be explained with reference to the drawings. FIGS. 5 and 6 are cross-sectional views of one embodiment of a door opening trim weather strip in accordance with the present invention. FIG. 5 shows the door opening trim weather strip which is prior to attachment to a door opening portion of a motor vehicle, and FIG. 6 shows the door opening trim weather strip which is in an attached state to the door opening portion of the motor vehicle.

As shown in FIGS. 5 and 6, a door opening trim weather strip 36 includes a trim portion 38 for attaching to a flange 20 in a door opening portion 10 of a vehicle body, and a tubular seal portion 40 for contacting a protruding part 22 of a door frame of a vehicle door 12 to provide a seal between the door opening portion 10 and the vehicle door 12.

The tubular seal portion 40 is formed outside an outer side wall 42 of the trim portion 38 integrally therewith. The tubular seal portion 40 may be formed on a bottom wall 44 of the trim portion 38 according to the position and the configuration of the vehicle body and flange 20.

The tubular seal portion 40 includes two base parts 46 which are respectively extend from two positions of the outer side wall 42 near the bottom wall 44 and near the open mouth of the trim portion 38, an arc-shaped part 48 formed continuously with the base parts 46 into a generally arc-shaped cross-section, and a bridge part 50 which has an inverted v-shaped cross-section and extends inside the arc-shaped part 52 to connect two positions of the arc-shaped part 48 like a bridge.

The base parts 46 project from the outer side wall 42 integrally therewith, and are composed of a solid rubber identical to that of the outer side wall 42.

The arc-shaped part 48 is composed of a sponge rubber, and is formed continuously and integrally with the base parts 46. A through hole 52 is formed in the arc-shaped part 48 to let air escape from an interior of the tubular seal portion 40 when the tubular seal portion 40 is compressed by the closed door 12, thereby reducing a force required for closing the door 12.

A projection 54 is provided at a top of the arc-shaped part 48.

The bridge part 50 is provided across the arc-shaped part 48 to improve the noise insulating properties. The arc-shaped part 48 and the bridge part 50 are composed of a sponge rubber. The bridge part 50 may be omitted according to attaching positions in the vehicle body.

The trim portion 38 includes an outer side wall 42, a bottom wall 44 and an inner side wall 56, and is formed to have a generally U-shaped cross-section in the attached state to the flange 20. The door opening trim weather strip 36 is attached to a vehicle body by a roll forming method. The outer side wall 42 and the inner side wall 56 of the trim portion 38 prior to attachment to the flange 20 are slightly spread apart to enlarge the width of an open mouth thereof, thereby facilitating the insertion of the flange 20 in the trim portion 38. After the trim portion 38 is positioned on and provisionally set on the flange 20 by setting the flange 20 in the trim portion 38, the outer side wall 42 and the inner side wall 56 of the trim portion 38 are clamped to narrow the width of the open mouth of the trim portion 38 into a generally U-shaped cross-section by means of a pair of caulking rollers. Thus, the attachment of the door opening trim weather strip 36 is completed.

A core member 58 is embedded inside the outer side wall 42, the bottom wall 44 and the inner side wall 56 of the trim portion 38, thereby improving the holding strength of the trim portion 38 against the flange 20.

The core member 58 may be composed of a metal sheet such as an iron sheet, etc. or a hard synthetic resin sheet. In the case of metallic core members, in order to exhibit flexibility which facilitates the attachment of the door opening trim weather strip 36 to corners, strip-shaped metal sheets are joined to each other via a connecting parts. After forming the trim portion 38, the connecting parts of the core member 58 are cut off, thereby further improving the flexibility of the trim portion 38.

The trim portion 38 may be also formed by covering the core member 58 with a solid rubber.

A first outer flange holding lip 60 is provided at an opening end of the outer side wall 42 and extends toward the open mouth of the trim portion 38 into a generally arc-shaped cross-section. In the attached state of the trim portion 38, the first outer flange holding lip 60 contacts and seals the flange 20.

A second outer flange holding lip 62, a third outer flange holding lip 64, a fourth outer flange holding lip 66 and a fifth outer flange holding lip 68 extend from the inside surface of the outer side wall 42 obliquely toward the bottom wall 44 of the trim portion 38. These outer flange holding lips 62, 64, 66 and 68 are arranged from the side of the open mouth of the trim portion 38 to the side of the bottom wall 44 in this order, and have an approximately identical length to each other.

A cover lip 70 extends inwardly from a joint of the bottom wall 44 and the inner side wall 56. The cover lip 70 serves to conceal the trim portion 38 as well as an end of a garnish (not shown) from a vehicle compartment when the door opening trim weather strip 36 is attached to the door opening portion of the vehicle body, thereby improving the appearance in the vehicle compartment.

The inner side wall 56 is formed slightly higher than the outer side wall 42. A first inner flange holding lip 72 and a second inner flange holding lip 74 extend from an inside surface of the inner side wall 56 toward the bottom wall 44. The first inner flange holding lips 72 is provided close to the open mouth of the trim portion 38, whereas the second inner flange holding lips 74 is provided near the bottom wall 44.

The first inner flange holding lip 72 has a connecting part 76 which extends from the inner side wall 56 obliquely toward the open mouth of the trim portion 38, a main part 78 which bends from an extending end of the connecting part 76 and extends obliquely toward the outer side wall 42, and an end part 80 which is provided at an end of the main part 78 so as to project toward the bottom wall 44. A recess 82 is defined between the main part 78 and the end part 80 so as to face the second inner flange holding lip 74. In addition, a projection 84 extends from a joint between the connecting part 76 and the main part 78 obliquely toward the inner side wall 56 to prevent an end of the flange 20 from entering a space between the connecting part 76 and the inner side wall 56 when the flange 20 is inserted into the interior of the trim portion 38.

The main part 78 has a greater thickness than the connecting part 76, and is formed to have such a length that when the main part 78 is pressed by the flange 20, the end part 80 does not contact the second inner flange holding lip 74.

The second inner flange holding lip 74 has a substantially similar configuration to that of the first inner flange holding lip 72, and has a connecting part 86, a main part 88, an end part 90 and a groove 92 which is defined between the main part 88 and the end part 90. The second inner flange holding lip 74 does not have such a projection as is provided in the first inner flange holding lip 72, because the first inner flange holding lip 72 projects over the second inner flange holding lip 74, and accordingly, there does not occur entering of the end of the flange 20 between the connecting part 86 and the inner side wall 56. Where the end of the flange 20 deflects slightly and does not enter the space between the connecting part 76 and the inner side wall 56, the projection 84 is not required in the first inner flange holding lip 72.

FIG. 6 shows the state where the door opening trim weather strip 36 is attached to the flange 20 provided by joining and welding an outer panel 94 and an inner panel 96 in the door opening portion of the vehicle body.

To mount the door opening trim weather strip 36 on the flange 20, at first, the door opening trim weather strip 36 having the trim portion 38 of which side walls are spaced from each other and slightly spread apart, as shown in FIG. 5, is positioned on and provisionally set on the flange 20 by holding a projecting end of the flange 20 with the fifth outer flange holding lip 68 and the second inner flange holding lip 74 of the trim portion 38. Alternatively, the projecting end of the flange 20 may be held with the fourth and fifth outer flange holding lips 66 and 68 and the second inner flange holding lip 74.

Then, the provisionally set door opening trim weather strip 36 is mounted on the flange 20 by clamping the trim portion 38 into a generally U-shaped cross-section by means of a pair of caulking rollers adapted to be used in a roll forming method. The outer side wall 42 and the inner side wall 56 of the trim portion 38 are further bent toward each other to narrow the open mouth of the trim portion 38 and make the outer side wall 42 and the inner side wall 56 parallel with each other, whereby the outer and inner flange holding lips of the trim portion 38 can securely hold the flange 20 of the vehicle body.

Since the side walls 42 and 56 of the trim portion 38 are slightly spread apart, the positioning and provisionally setting of the trim portion 38 can be carried out without being blocked by the flange holding lips, whereby the mounting work of the trim portion 38 is facilitated.

In the attaching state of the door opening trim weather strip to the flange 20, as shown in FIG. 6, the trim portion 38 holds the flange 20 with two inner flange holding lips 72 and 74 and five outer flange holding lips 60, 62, 64, 66 and 68, whereby the trim portion 38 can hold the flange 20 securely.

In addition, the first outer flange holding lip 60 has an arc-shaped cross-section and is composed of a sponge rubber, the first outer flange holding lip 60 comes into elastically contact with the flange 20, thereby providing a good seal between the flange 20 and the trim portion 38.

When the flange 20 is held in the interior of the U-shaped trim portion 38, the end part 80 of the first inner flange holding lip 72 and the end part 90 of the second inner flange holding lip 74 contact the flange 20 to hold the flange 20. The connecting parts 76 and 86 of these lips 72 and 74 flex in accordance with the thickness of the flange 20. The connecting parts 76 and 86 are made thinner than the main parts 78 and 88 of these lips 72 and 74 so as to readily flex. This results in these lips 72 and 74 holding the flange 20 in accordance with the thickness thereof.

The connecting part 76 and the main part 78 of the first inner flange holding lip 72 as well as the connecting part 86 and the main part 88 of the second inner flange holding lip 74 define a generally inverted v-shaped cross-section. With this arrangement, the main parts 78 and 88 is not made long, accordingly, where the connecting parts 76 and 86 flex, the end part 80 provided at an end of the main part 78 of the holding lip 72 does not contact the main part 88 of the holding lip 74 so as not to block the flexing of the main part 78.

In addition, since the main part 88 of the second inner flange holding lip 74 is not made long, the end part 90 thereof does not contact the bottom wall 44, and the flexing of the second holding lip 74 is not blocked.

Furthermore, since the inner flange holding lips 72 and 74 respectively have a generally inverted v-shaped cross-section, the main parts 78 and 88 can be made short, and accordingly, the inner side wall 56 of the trim portion 38 is not required to make high, thereby reducing the weight of the trim portion 38.

When a pulling force is applied, the thick main parts 78 and 88 of the inner flange holding lips 72 and 74 are difficult to deform so that a pulling load of the flange 20 increases, and the door opening trim weather strip 36 is difficult to be pulled off the flange 20.

In addition, since the projection 84 is provided at the joint between the connecting part 76 and the main part 78 of the first inner flange holding lip 72 so as to project toward the inner side wall 56, where the door opening trim weather strip 36 is apt to be pulled off the flange 20, the projection 84 contacts the inner side wall 56 to prevent further deformation of the main part 78 of the first inner flange holding lip 72.

Furthermore, the projection 84 prevents the end of the flange 20 which deflects during insertion in the trim portion 38 from entering the space between the connecting part 76 of the inner holding lip 72 and the inner side wall 56, and guides the end of the flange 20 in the interior of the trim portion 38.

Since the end parts 80 and 90, each having a generally L-shaped cross-section, are provided at the ends of the main parts 78 and 88 of the inner holding lips 72 and 74, and recesses are provided between the main parts 78 and 88 and the end parts 80 and 90, the end parts 80 and 90 can be made thick, and can readily bend toward the inner side wall 56. Consequently, the rigidity of the end parts 80 and 90 increases, whereby, when the flange 20 tends to come out of the trim portion 38, the end parts 80 and 90 are prevented from being deformed by the flange 20.

As described above, the trim portion 38 can be attached to the flange 20 securely, and accordingly, the door opening trim weather strip 36 can be mounted on the vehicle body without tilting relative to the vehicle body. When the vehicle door is closed, the tubular seal portion 40 contacts the protruding part 22 of the vehicle door 12 to provide a seal between the vehicle door 12 and the door opening portion of the vehicle body. The bridge part 50 inside the tubular seal portion 40 improves the noise insulating properties of the door opening trim weather strip 36. The tubular seal portion 40 and the bridge part 50 are composed of a sponge rubber, and accordingly, they exhibit flexibility and elasticity to deform in conformity with the configuration of the protruding part 22 of the vehicle door 12, thereby providing a good seal between the vehicle door 12 and the door opening portion of the vehicle body.

In the present embodiment, the door opening trim weather strip is attached to the door opening portion facing a side door of a motor vehicle. The door opening trim weather strip in accordance with the present invention may be applied to provide a seal around a rear door, trunk room and roof opening of a motor vehicle. In the case of the trunk room, a trunk lid corresponds to the vehicle door of the present embodiment, and in the case of the roof opening, a detachable roof panel and sliding roof panel correspond to the vehicle door of the present embodiment.

In accordance with the present invention, there can be provided the door opening trim weather strip having flange holding lips, which can be readily attached to a flange in a door opening portion of a vehicle body, and is difficult to be pulled off the flange irrespective of the variation of the thickness of the flange.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A door opening trim weather strip for a motor vehicle for providing a seal between a door opening portion of a body of a motor vehicle, and a door thereof, comprising:

a trim portion in which a flange provided in the door opening portion is adapted to be inserted, and a tubular seal portion for sealing between the door opening portion and the door, said trim portion having a generally U-shaped cross-section, and including an outer side wall, a bottom wall and an inner side wall, said trim portion further including outer flange holding lips which extend inwardly from said outer side wall, and inner flange holding lips which extend inwardly from said inner side wall, for holding the flange inserted in said trim portion, said inner flange holding lips being composed of two inner flange holding lips, each of said two inner flange holding lips having a connecting part which slightly extends from said inner side wall obliquely toward an open mouth of said trim portion, and a main part which extends from an extending end of said connecting part obliquely toward said bottom wall, thereby defining a generally inverted v-shaped cross-section.

2. A door opening trim weather strip for a motor vehicle as claimed in claim 1, wherein said main part of each of said two inner flange holding lips has a greater thickness than said connecting part, each of said two inner flange holding lips further has an end part which extends from said main part toward said bottom wall into a generally L-shaped cross-section, and a recess is formed between said main part and said end part so as to face said bottom wall.

3. A door opening trim weather strip for a motor vehicle as claimed in claim 1, wherein said main part of each of said two inner flange holding lips is provided with a projection which projects from a vicinity of a joint between said connecting part and said main part toward said inner side wall so as to face said open mouth of said trim portion.

* * * * *